(12) United States Patent
Ohhashi et al.

(10) Patent No.: US 7,124,749 B2
(45) Date of Patent: Oct. 24, 2006

(54) AIR TRANSFER APPARATUS AND CONTROL METHOD OF AIR TRANSFER APPARATUS

(75) Inventors: Hironori Ohhashi, Atsugi (JP); Hajime Hosoya, Atsugi (JP)

(73) Assignee: Hitachi, Ltd., Tokyo-to (JP)

( * ) Notice: Subject to any disclaimer, the term of this patent is extended or adjusted under 35 U.S.C. 154(b) by 105 days.

(21) Appl. No.: 10/926,355

(22) Filed: Aug. 26, 2004

(65) Prior Publication Data

US 2005/0044931 A1 Mar. 3, 2005

(30) Foreign Application Priority Data

Aug. 27, 2003 (JP) ............................. 2003-302396

(51) Int. Cl.
*F02M 33/04* (2006.01)
*F02B 75/00* (2006.01)

(52) U.S. Cl. .................................. 123/520; 123/198 D

(58) Field of Classification Search ................ 123/516, 123/518, 519, 520, 198 D, 198 B; 73/40, 73/46, 118
See application file for complete search history.

(56) References Cited

U.S. PATENT DOCUMENTS 5,383,437 A * 1/1995 Cook et al. ................. 123/520
5,411,004 A 5/1995 Busato et al.
5,817,925 A 10/1998 Cook et al.
5,987,968 A * 11/1999 Cook et al. ................... 73/49.7
6,360,729 B1 * 3/2002 Ellsworth .................... 123/518
6,722,348 B1 * 4/2004 Nagasaki et al. ........... 123/520
2003/0074958 A1 * 4/2003 Nagasaki et al. .......... 73/118.1

FOREIGN PATENT DOCUMENTS

JP    2003-13810 A    1/2003

OTHER PUBLICATIONS

U.S. Appl. No. 10/926,354, filed Aug. 26, 2004, Ohhashi et al.
U.S. Appl. No. 10/932,046, filed Sep. 2, 2004, Ohhashi et al.

* cited by examiner

*Primary Examiner*—Mahmoud Gimie
(74) *Attorney, Agent, or Firm*—Foley & Lardner LLP

(57) ABSTRACT

A check valve disposed between an air pump and a section to be pressurized, is held in a closed state when the section is pressurized by said air pump, and is operated to open when the electric power is supplied to an electromagnetic solenoid. In an abnormally pressurized state, the power supply to the electromagnetic solenoid is shut off, to forcibly close the check valve.

14 Claims, 3 Drawing Sheets

AIR TRANSFER APPARATUS AND CONTROL METHOD OF AIR TRANSFER APPARATUS

FIELD OF THE INVENTION

The present invention relates to an air transfer apparatus for supplying air to a shielded section by an air pump or sucking air from the shielded section by the air pump, and a control apparatus of the air transfer apparatus.

RELATED ART

Japanese Unexamined Patent Publication No. 2003-013810 discloses a diagnosis apparatus for diagnosing whether or not the leakage occurs in a fuel vapor passage of a fuel vapor purge system.

In this diagnosis apparatus, the fuel vapor passage is shielded by means of a valve, and the shielded section is supplied with air by an air pump, to be pressurized.

Then, based on a driving load of the air pump, it is judged whether or not the leakage occurred in the fuel vapor passage.

However, in the case of pressuring the shielded section by the air pump, if an operation of the air pump is unable to be stopped due to a failure of the air pump, the shielded section is pressurized up to an abnormally high pressure.

Further, in the leakage diagnosis in the fuel vapor passage, it is needed to prevent the fuel vapor from leaking through the air pump.

Moreover, if the fuel vapor invades into a motor section of the air pump, sometimes, a circuit portion of the motor corrodes due to the fuel vapor.

SUMMARY OF THE INVENTION

The present invention has an object to avoid that a shielded section is abnormally pressurized or depressurized by an air pump, and to avoid the invasion of the fuel vapor into a motor section of the air pump.

In order to achieve the above object, according to the present invention, a valve capable of performing a desired opening/closing operation is used as a check valve disposed in a passage through which air is transferred by an air pump.

The other objects and features of this invention will become understood from the following description with reference to the accompanying drawings.

DESCRIPTION OF EMBODIMENTS

Figure 1:
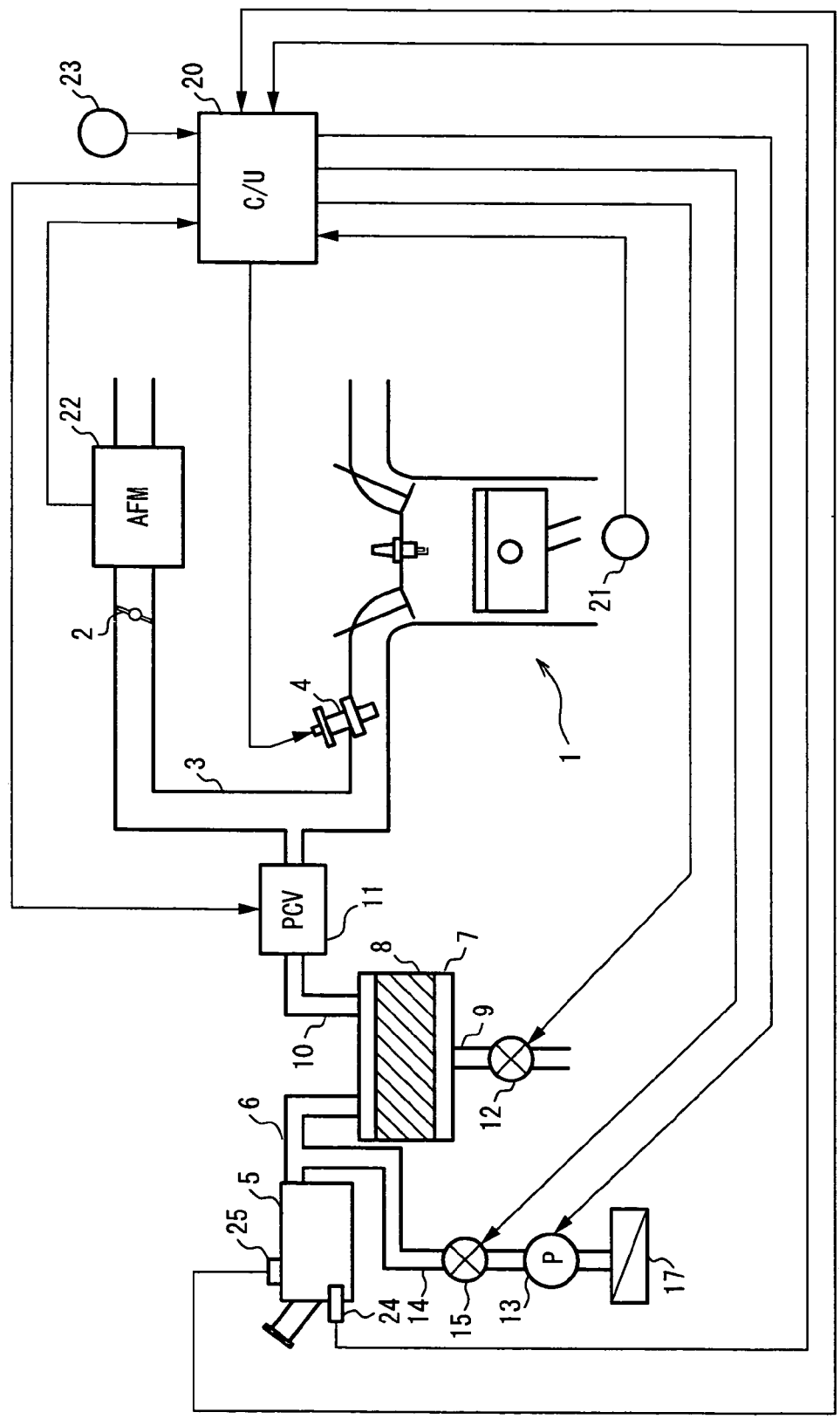
FIG. 1 is a diagram showing an internal combustion engine in an embodiment.

An internal combustion engine 1 shown In FIG. 1 is a gasoline engine installed in a vehicle.

A throttle valve 2 is disposed in an intake pipe 3 of internal combustion engine 1.

An intake air amount of internal combustion engine 1 is controlled by throttle valve 2.

For each cylinder, an electromagnetic type fuel injection valve 4 is disposed in a manifold portion of intake pipe 3 on the downstream side of throttle valve 2.

Fuel injection valve 4 injects fuel based on an injection pulse signal output from a control unit 20 incorporating therein a microcomputer.

Internal combustion engine 1 is provided with a fuel vapor purge system.

Fuel vapor purge system comprises an evaporation passage 6, a canister 7, a purge passage 10 and a purge control valve 11.

Fuel vapor generated in a fuel tank 5 is trapped to canister 7 via evaporation passage 6.

Canister 7 is a container filled with the adsorbent 8 such as activated carbon.

Further, a new air inlet 9 is formed to canister 7, and a purge passage 10 is connected to canister 7.

Purge passage 10 is connected to intake pipe 3 on the downstream side of throttle valve 2 via purge control valve 11.

Purge control valve 11 is opened based on a purge control signal output from control unit 20.

When a predetermined purge permission condition is established during an operation of internal combustion engine 1, purge control valve 11 is controlled to open.

When purge control valve 11 is controlled to open, an intake negative pressure of internal combustion engine 1 acts on canister 7, so that the fuel vapor adsorbed to canister 7 is detached by the fresh air, which is introduced through new air inlet 9.

Purged gas inclusive of the fuel vapor detached from canister 7 passes through purge passage 10 to be sucked into intake pipe 3.

Control unit 20 incorporates therein a microcomputer comprising a CPU, a ROM, a RAM, an A/D converter and an input/output interface.

Control unit 20 receives detection signals from various sensors.

As the various sensors, there are provided a crank angle sensor 21 detecting a rotation angle of a crankshaft, an air flow meter 22 measuring an intake air amount of internal combustion engine 1, a vehicle speed sensor 23 detecting a vehicle speed, a pressure sensor 24 detecting a pressure in fuel tank 5, and a fuel level sensor 25 detecting a fuel level in fuel tank 5.

Further, a drain cut valve 12 for opening/closing new air inlet 9 and an air pump 13 for supplying air to evaporation passage 6 are disposed, for diagnosing whether or not the leakage occurred in a fuel vapor passage of the fuel vapor purge system.

A discharge port of air pump 13 is connected to evaporation passage 6 via an air supply pipe 14.

An electromagnetic check valve 15 is disposed in the halfway of air supply pipe 14.

Electromagnetic check valve 15 is provided with an electromagnetic solenoid as an actuator generating the valve opening energy.

Then, electromagnetic check valve 15 can be opened/closed by performing the ON/OFF control of the electromagnetic solenoid, irrespective of a primary side pressure of electromagnetic check valve 15.

Further, an air cleaner 17 is disposed on the inlet port side of air pump 13.

When a diagnosis condition is established, control unit 20 controls purge control valve 11 and drain cut valve 12 to close.

As a result, a fuel tank 5, evaporation passage 6, canister 7 and purge passage 10 on the downstream of purge control valve 11, are shielded as a diagnosis section.

Here, if air pump 13 is activated, the diagnosis section is pressurized.

Then, it is diagnosed an occurrence of leakage in the diagnosis section, based on a pressure change in fuel tank 5 at the time when the diagnosis section is pressurized by air pump 13.

Note, it is possible to diagnose the occurrence of leakage, based on the pressure drop after the diagnosis section is pressurized up to a predetermined pressure.

Further, it is possible to diagnose the occurrence of leakage, based on a driving load of air pump 13 at the time when the diagnosis section is pressurized.

Moreover, it is possible that the pressure in the diagnosis section is reduced by sucking the air from the diagnosis section by air pump 13, to diagnose the occurrence of leakage, based on the pressure in fuel tank 5 or the driving load of air pump 13 at the time.

Figure 2:
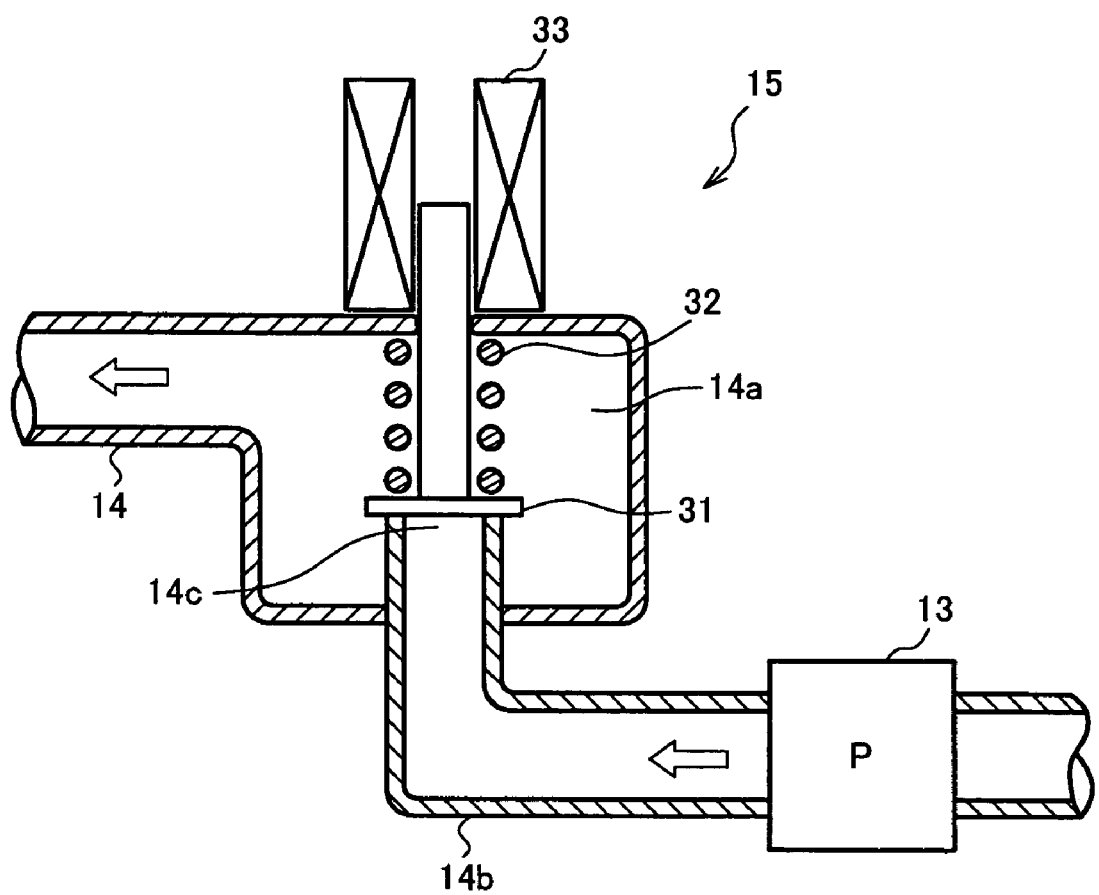
FIG. 2 is a diagram showing a structure of an electromagnetic check valve in the embodiment.

Electromagnetic check valve 15 is configured as shown in FIG. 2.

A volumetric chamber 14a, which is opened toward the downstream side, is formed in the halfway of air supply pipe 14.

Volumetric chamber 14a is connected to the discharge port of air pump 13 via air piping 14b.

An open end 14c of air piping 14b passes through a wall of volumetric chamber 14a, to be extended into volumetric chamber 14a.

A plate shaped valve 31 blocking open end 14c is urged by a coil spring 32 to a direction blocking open end 14c.

A fluid pressure in a backflow direction toward air pump 13 from evaporation passage 6, acts as a pressure to close valve 31, thereby preventing the backflow.

Further, electromagnetic check valve 15 is provided with an electromagnetic solenoid 33, which is supplied with the electric power to apply an electromagnetic force for valve opening on valve 31.

Here, a setting load of spring force of coil spring 32 is set to be a maximum generated pressure or above of air pump 13.

Accordingly, even if air pump 13 is driven at a maximum, in a state where electromagnetic solenoid 33 is OFF, electromagnetic check valve 15 is held in a closed state.

Therefore, when the diagnosis section is supplied with the air to be pressurized by air pump 13, electromagnetic solenoid 33 is turned ON, to generate the valve opening energy against an urging force for valve closing by coil spring 32.

Further, for example, when air pump 13 becomes unable to be stopped due to a failure of a driving system, the supply of electric current to electromagnetic solenoid 33 is shut off. Therefore, electromagnetic check valve 15 is closed by means of the urging force for valve closing by coil spring 32, thus, it is possible to avoid that the diagnosis section is excessively pressurized.

As a result, it is possible to arbitrarily open/close electromagnetic check valve 15, by controlling the supply of electric current to electromagnetic solenoid 33.

Further, in the case where electromagnetic check valve 15 is disposed between evaporation passage 6 and air pump 13, the fuel vapor within evaporation passage 6 is prevented from reaching air pump 13.

Moreover, if the fuel vapor can be prevented from invading into air pump 13, by electromagnetic check valve 15, it becomes unnecessary to apply a complicated and expensive sealing structure.

Note, in the case where the diagnosis section is pressurized, electromagnetic check valve 15 can be disposed on an inlet side of air pump 13.

Further, in the case where the diagnosis section is depressurized, electromagnetic valve 15 can be disposed on a discharge side of air pump 13.

However, in order to reliably avoid that the fuel vapor from fuel vapor passage reaches air pump 13, in the case where the diagnosis section is pressurized, electromagnetic check valve 15 is disposed on the discharge side of air pump 13, while being disposed on the inlet side of air pump 13 in the case where the diagnosis section is depressurized.

Figure 3:
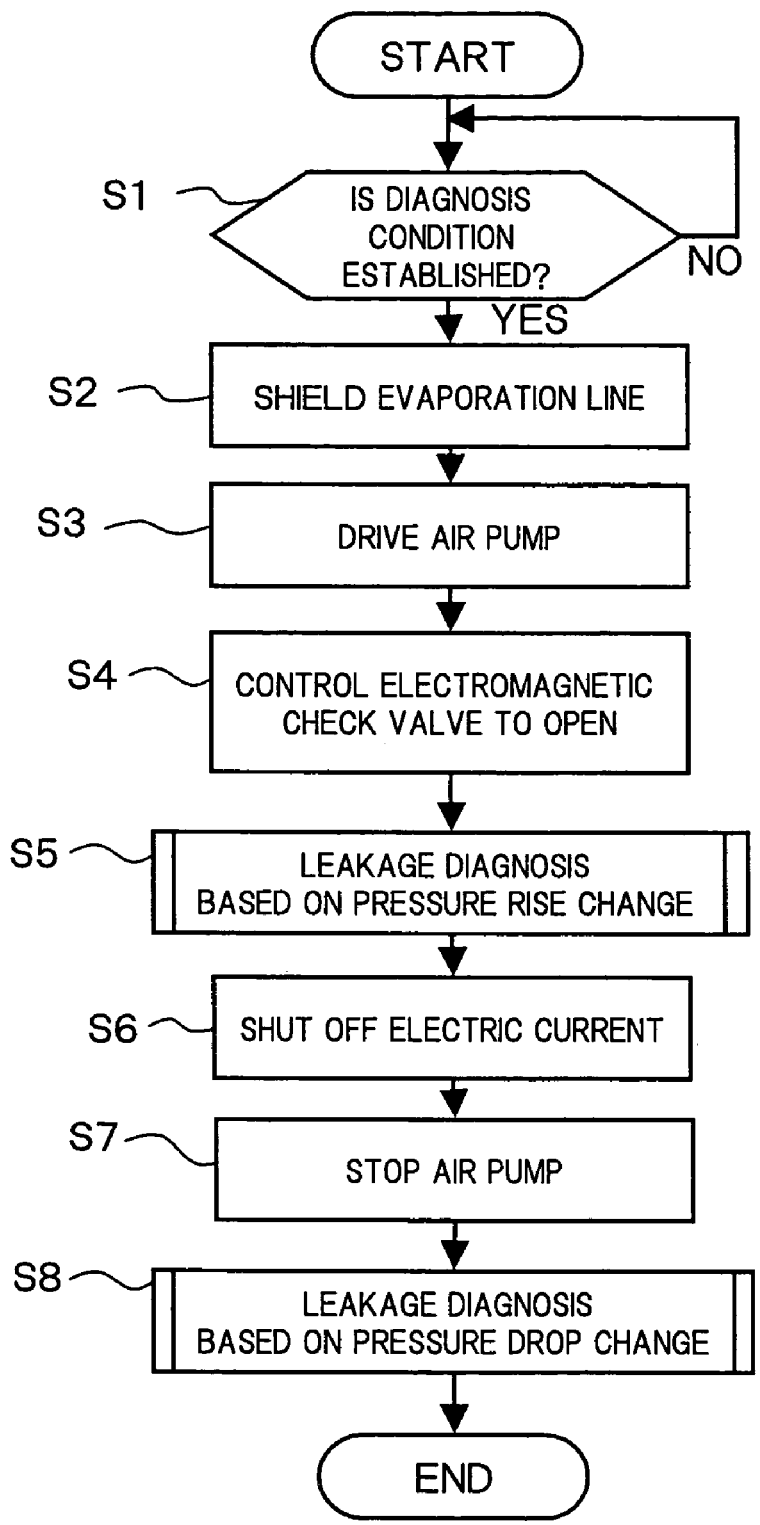
FIG. 3 is a flowchart showing a leakage diagnosis process in the embodiment.

FIG. 3 is a flowchart showing the leakage diagnosis process.

In step S1, it is judged whether or not a leakage diagnosis execution condition is established.

If the leakage condition is established, control proceeds to step S2.

In step S2, in order to shield a section to be subjected to leakage diagnosis, purge control valve 11 and drain cut valve 12 are controlled to close.

In step S3, the pressurization by air pump 3 is started.

Subsequently, in step S4, an electric current is supplied to electromagnetic solenoid 33 of electromagnetic check valve 15, to open electromagnetic check valve 15. As a result, the air pressurized by air pump 13 is supplied to the diagnosis section via electromagnetic check valve 15.

In step S5, based on a rise characteristic of the pressure in fuel tank 5, it is diagnosed whether or not the leakage occurred.

When the leakage diagnosis is finished, control proceeds to step S6.

In step S6, the supply of electric current to electromagnetic solenoid 33 is stopped, to close electromagnetic check valve 15.

Subsequently, control proceeds to step S7, where the driving of air pump 13 is stopped.

Then, in step S8, the leakage diagnosis is performed, based on a pressure change in fuel tank 5 under a condition where the pressure is confined within the diagnosis section.

Note, the leakage diagnosis may be performed based on either a pressure rise change with the pressurization or a pressure drop change after the stop of pressurization.

Here, by stopping the supply of electric current to electromagnetic solenoid 33, electromagnetic check valve 15 is closed, and further, electromagnetic check valve 15 is never operated to open, with the pressurization by air pump 13.

Accordingly, even if air pump 13 is not stopped although the control of stopping the driving of air pump 13 is performed, the shielded section is never excessively pressurized.

Note, the structure of electromagnetic check valve 15 is not limited to that shown in FIG. 2.

Further, the actuator generating the opening energy for check valve is not limited to the electromagnetic solenoid, and other types of actuators can be used.

Moreover, the configuration can be such that, by switching the electric current supply directions for electromagnetic solenoid 33, the electromagnetic force for valve opening and the electromagnetic force for valve closing are selectively generated.

The entire contents of Japanese Patent Application No. 2003-302396 filed on Aug. 27, 2003, a priority of which is claimed, are incorporated herein by reference.

While only a selected embodiment has been chosen to illustrate the present invention, it will be apparent to those skilled in the art from this disclosure that various changes and modifications can be made herein without departing from the scope of the invention as defined in the appended claims.

Furthermore, the foregoing description of the embodiment according to the present invention is provided for illustration only, and not for the purpose of limiting the invention as defined in the appended claims and their equivalents.

What is claimed is:

1. An air transfer apparatus comprising:
   an air pump transferring air to a shielded section; and
   a check valve disposed in a passage through which the air is transferred by said air pump, said check valve comprising:
      a spring urging said valve body to be closed; and
      an actuator operating a valve body to open,
   wherein said check valve is capable of performing a desired opening/closing operation,
   wherein said check valve is held in a closed state when said actuator does not operate, while being held in an opened state when said actuator operates,
   wherein an urging force for valve closing by said spring is set to be a value by which said valve body is held in a closed state thereof, even if a primary side pressure of said valve body is maximized by said air pump, and
   wherein said actuator generates, according to a control signal, a driving force for opening said valve body against the urging force for valve closing by said spring.

2. An air transfer apparatus according to claim 1, wherein said actuator is an electromagnetic solenoid.

3. An air transfer apparatus according to claim 1, wherein said check valve is disposed in a piping connecting said shielded section and said air pump.

4. An air transfer apparatus according to claim 1,
   wherein said air pump supplies air to said shielded section, and
   wherein said check valve is disposed on an inlet side of said air pump.

5. An air transfer apparatus according to claim 1,
   wherein said air pump sucks air from said shielded section, and
   wherein said check valve is disposed on a discharge side of said air pump.

6. An air transfer apparatus according to claim 1, wherein said shielded section is formed by shielding, by means of a valve, a section of a fuel vapor passage in a fuel vapor purge system of an internal combustion engine.

7. An air transfer apparatus according to claim 1, further comprising:
   a pressure detector detecting a pressure within said shielded section; and
   a control circuit receiving a detection signal from said pressure detector to control an open/close operation of said check valve,
   wherein said control circuit drives said air pump and also operates said check valve to open, to change a pressure in said shielded section, and based on the detection result of said pressure detector at the time, diagnoses whether or not the leakage occurred in said shielded section.

8. An air transfer apparatus according to claim 1, further comprising:
   a pressure abnormality detector detecting a pressure abnormal state within said shielded section; and
   a control circuit receiving a detection signal from said pressure abnormality detector, to control an open/close operation of said check valve,
   wherein said control circuit operates said check valve to close, when the pressure abnormal state within said shielded section is detected by said pressure abnormality detector.

9. An air transfer apparatus according to claim 8, wherein said pressure abnormality detector detects a state where said air pump is unable to be stopped, as the pressure abnormal state.

10. An air transfer apparatus according to claim 1, further comprising:
    a control circuit outputting a driving control signal to said air pump and also controlling an open/close operation of said check valve,
    wherein said control circuit operates said check valve to open, after starting to drive said air pump.

11. An air transfer apparatus according to claim 1, further comprising:
    a control circuit outputting a driving control signal to said air pump and also controlling an open/close operation of said check valve,
    wherein said control valve stops the driving of said air pump after operating said check valve to close.

12. A control method of an air transfer apparatus equipped with an air pump transferring air to a shielded section; and a check valve disposed in a passage through which the air is transferred by said air pump, said check valve including an actuator operating a valve body to open, the control method comprising the steps of:
    judging whether said check valve is required to open or close, by:
       detecting an abnormal state where said air pump is unable to be stopped based on a pressure in said shielded section; and
       judging that said check valve is required to close when said abnormal state is detected;
    generating valve opening energy by the actuator in response to a requirement for opening said check valve, to open said check valve; and
    stopping the generation of the valve opening energy by the actuator in response to a requirement for closing said check valve, thereby holding said check valve in a closed state.

13. A control method of an air transfer apparatus equipped with an air pump transferring air to a shielded section; and a check valve disposed in a passage through which the air is transferred by said air pump, said check valve including an actuator operating a valve body to open, the control method comprising the steps of:
    judging whether said check valve is required to open or close by:
       detecting an abnormal state of a pressure in said shielded section by:
          detecting an activation of said air pump; and
          judging the activation of said air pump, as the requirement for opening said check valve, and
       judging that said check valve is required to close when said abnormal state is detected;

generating valve opening energy by the actuator in response to a requirement for opening said check valve, to open said check valve after said air pump is activated; and stopping the generation of the valve opening energy by the actuator in response to a requirement for closing said check valve, thereby holding said check valve in a closed state.

14. A control method of an air transfer apparatus equipped with an air pump transferring air to a shielded section; and a check valve disposed in a passage through which the air is transferred by said air pump, said check valve including an actuator operating a valve body to open, the control method comprising the steps of:

judging whether said check valve is required to open or close by:
- detecting a requirement for stopping said air pump; and
- judging the requirement for stopping said air pump, as the requirement for closing said check valve, and generating valve opening energy by the actuator in response to a requirement for opening said check valve, to open said check valve before said air pump is stopped; and stopping the generation of the valve opening energy by the actuator in response to a requirement for closing said check valve, thereby holding said check valve in a closed state.

* * * * *